March 21, 1961
H. S. KINDLER ET AL
2,975,635
APPARATUS FOR DIRECTLY MEASURING MASS
OF FLUID FLOW PER UNIT OF TIME
Filed June 12, 1956
3 Sheets-Sheet 1
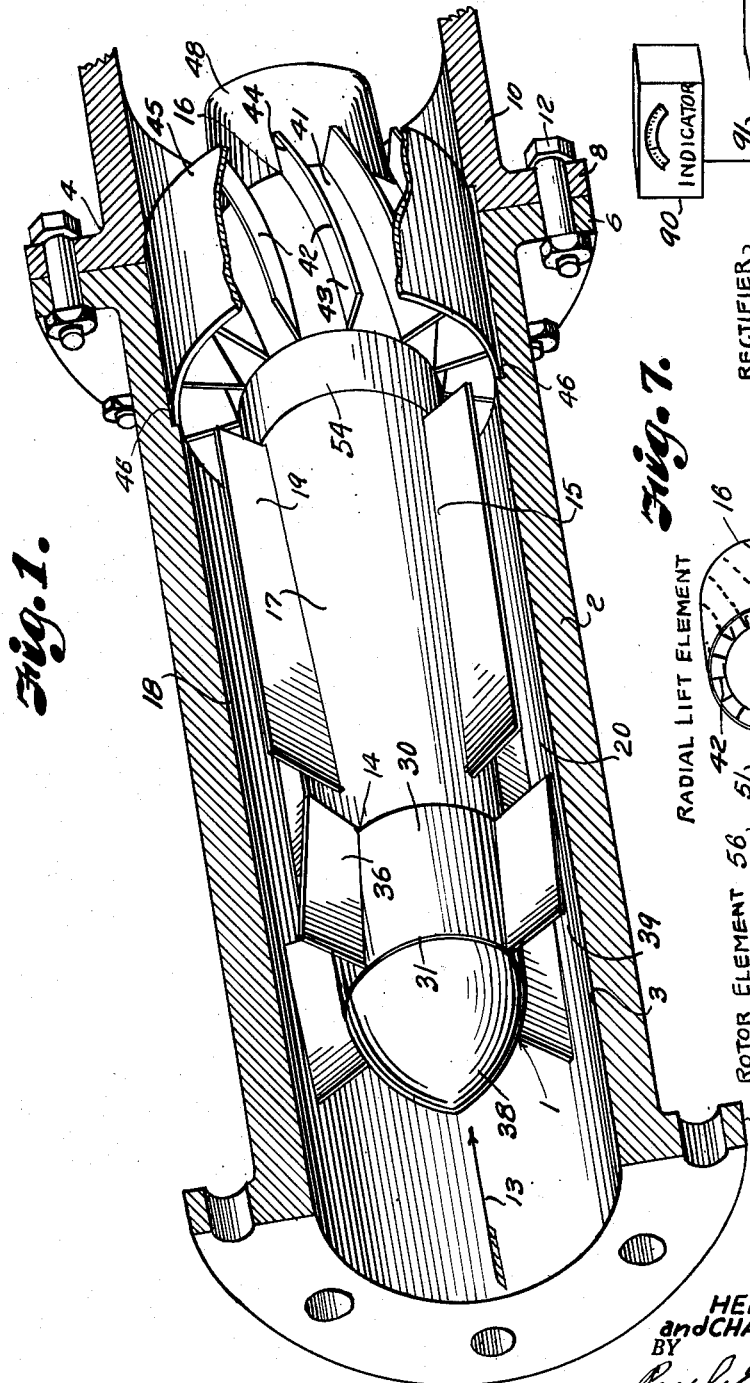
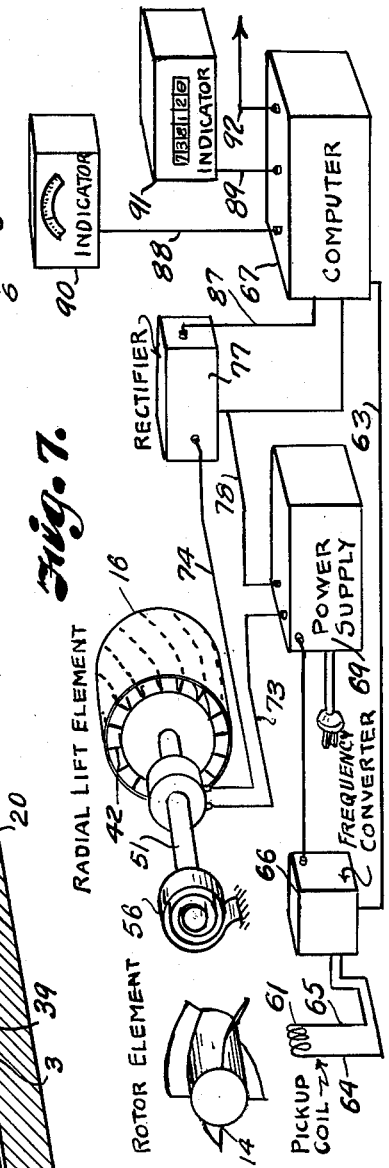
INVENTOR.
HERBERT S. KINDLER
and CHARLES M. HALSELL
BY
Paul E. Mullendore
ATTORNEY

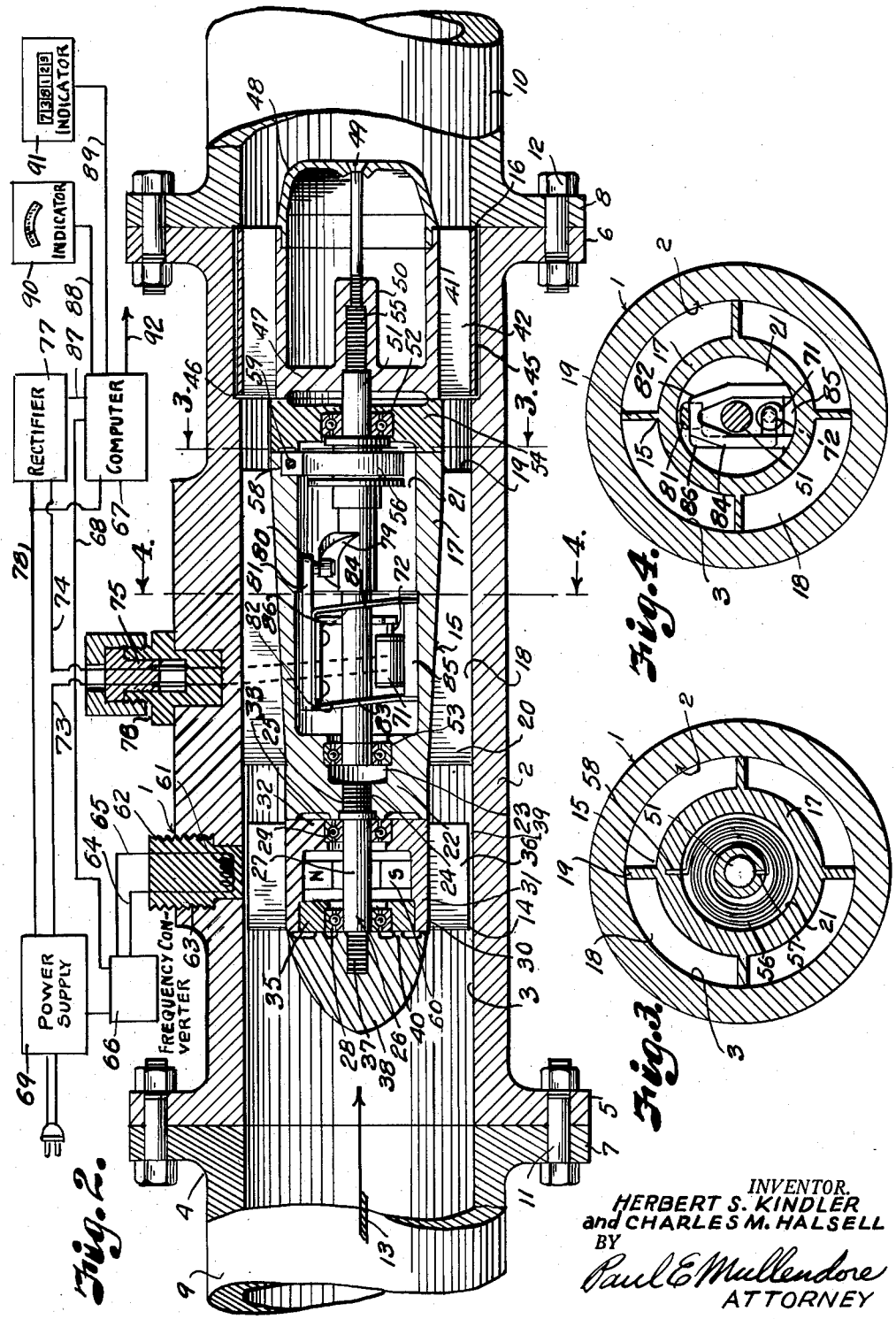

March 21, 1961
H. S. KINDLER ET AL
2,975,635
APPARATUS FOR DIRECTLY MEASURING MASS
OF FLUID FLOW PER UNIT OF TIME
Filed June 12, 1956
3 Sheets-Sheet 3
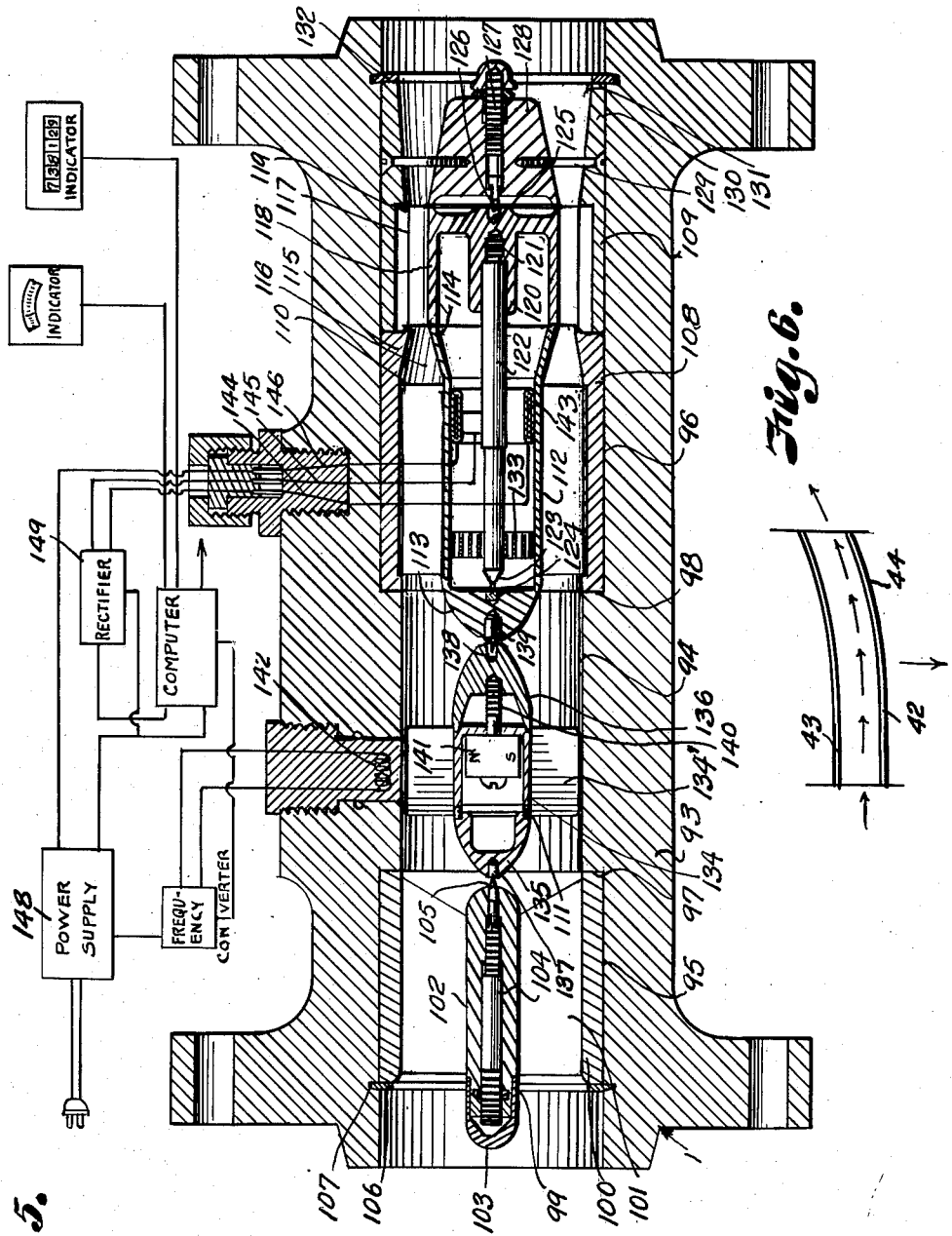
INVENTOR.
HERBERT S. KINDLER
and CHARLES M. HALSELL
BY
Paul E. Mullendore
ATTORNEY

2,975,635

APPARATUS FOR DIRECTLY MEASURING MASS OF FLUID FLOW PER UNIT OF TIME

Herbert S. Kindler and Charles M. Halsell, Oklahoma City, Okla., assignors to Black, Sivalls & Bryson, Inc., Kansas City, Mo., a corporation of Delaware, and Humble Oil and Refining Company, Houston, Tex., a corporation of Texas Filed June 12, 1956, Ser. No. 590,921

4 Claims. (Cl. 73—194)

This invention relates to an apparatus for measuring flow of fluid in a conduit, and more particularly for measuring the weight or mass of fluid flow per unit of time through a given cross sectional area of a conduit. Since the cross sectional area of a conduit is a constant for a given design, mass rate flow is the product of the fluid density and the average fluid velocity across a given cross sectional area of the conduit, however present methods of determining fluid density and velocity are substantially involved, require calculations, and the sensing elements employed sense only the fluid conditions which exist immediately adjacent the sensing elements, with the result that present methods and apparatus are inaccurate.

It is, therefore, a principal object of the present invention to provide an apparatus for accurately and mechanically recording and/or indicating mass flow of fluids per unit of time.

In accomplishing this object, the present invention contemplates sensing elements that are located directly in the fluid stream and activated by the entire fluid flow. Such sensing elements for determining velocity consist of a rotor which is turned responsive to velocity of the fluid stream, but the sensing element employed to determine density involves lift, drag or movement of the sensing element by deflection, and measurement of such deflection results in an arithmetical product of the mass rate flow times the velocity, and therefore the invention further includes means for dividing the resulting product by the velocity which is sensed through the rotor. Therefore, another object of the invention is to provide means for converting speed of the rotor and movement of the deflector into signals and integrating the signals into a signal designating mass flow.

A further object of the invention is to provide means for converting speed of the rotor and movement of the deflector into electric currents to be automatically computed in terms of an electrical current and the resulting current utilized to directly indicate and/or record the mass flow rate or the total integrated mass having passed through the conduit during an established time period.

Other objects of the invention are to provide sensing elements that are efficient in responding to fluctuations in the fluid flow, and to provide sensing mechanisms that are free from jamming due to particles that may be contained in the fluid to be measured.

In accomplishing these and other objects of the invention as hereinafter pointed out, we have provided an improved structure as illustrated in the accompanying drawings, wherein:

Fig. 1 is a perspective view of one form of apparatus, including velocity and velocity times mass flow rate sensing elements for determining mass flow velocity and constructed in accordance with the present invention.

Fig. 2 is a longitudinal section through the apparatus shown in connection with a flow conduit, the electric circuits and instruments being illustrated diagrammatically.

Fig. 3 is a cross section on the line 3—3 of Fig. 2.

Fig. 4 is a cross section on the line 4—4 of Fig. 2.

Fig. 5 is a longitudinal section through a modified form of apparatus employing the features of the present invention and showing the electrical instruments and circuits in diagram.

Fig. 6 is a fragmentary view of the blades of the density sensing element of the apparatus.

Fig. 7 is a diagrammatic perspective view of the working parts of the metering apparatus and electrical parts and circuits therefor.

Referring more in detail to the drawings:

The numeral 1 designates a sensing unit which includes a tubular casing 2 having an axial bore 3 corresponding with the internal diameter of a conduit 4 in which the unit is connected, as shown in Fig. 2. In the illustrated instance the connection is effected by providing the ends of the tubular body with flanges 5 and 6 corresponding with flanges 7 and 8 on the ends of normally adjoining conduit sections 9 and 10 of the conduit 4. The flanges 7 and 5 and 6 and 8 are connected with suitable fastening devices such as bolts 11 and 12. The sensing mechanisms are contained within the bore 3 coaxially of the flow of fluid through the conduit, as indicated by the arrow 13 (Figs. 1 and 2). The sensing mechanisms include a rotor 14 adapted to be actuated by velocity of the fluid flow, a device 15 for straightening the flow of the fluid after contact with the rotor 14 and a radial lift element 16, all arranged in coaxial alignment and having outer diameters corresponding with the cross sectional diameter of the bore 3. The device 15 constitutes the support for the rotor 14 and radial lift element 16 and consists of an elongated body portion 17 of circular cross section and of less diameter than the diameter of the bore 3 to provide an annular space 18 for passing the entire flow of the fluid stream. The body portion 17 is supported coaxially within the bore 3 by means of radial legs or fins 19 that extend longitudinally of the direction of the flow to direct the flow and parallel to the axial center of the bore 3.

In order to increase the velocity flow from the annular space 18, the body portion 17 tapers outwardly in the direction of the flow, so that the inlet 20 to the space 18 is of larger area than the discharge end to produce a venturi effect by which velocity of the flow is increased on discharge to the radial lift element 16, to assure sufficient velocity to carry away any solid particles that may be suspended in the fluid stream. The body portion 17 has an axial recess 21 opening from the downstream end thereof to accommodate an apparatus for transmitting action of the radial lift element 16, as later described. The upstream end is closed by a wall 22 of sufficient thickness to contain an axial recess 23 and an internally threaded smaller opening 24 for mounting the threaded end 25 of a spindle 26. The spindle 26 has a portion 27 extending in the upstream direction to carry antifriction bearings 28 and 29 which mount the rotor 14. The rotor 14 has a hub 30 including a cylindrical wall 31 having an outer diameter substantially conforming to the diameter of the upstream end of the body portion 17. The downstream end of the hub 30 is closed by an end wall 32 having an axial opening 33. The upstream end of the hub 30 contains a ring or head 35 to carry the bearing 28. Extending radially from the hub of the rotor are a plurality of relatively closely spaced blades or vanes 36 to be acted upon by the fluid as it passes from the conduit section 9 into the bore 3 and into the annular space 18 to turn the rotor in accordance with the velocity of the fluid stream. The spindle 26 has a reduced threaded extension 37 on the upstream end thereof for carrying a cowl 38 for facilitating distribution of the flow of fluid from the full capacity of the conduit 9 to the capacity of the annular passageway 39 which surrounds the hub of the rotor. This arrangement provides for an extremely fast response of the rotor to flow of the fluid, however upon a sudden deceleration in the flow, corresponding deceleration of the rotor may lag, with the result that the speed of the rotor may not immediately conform with the change in flow. To avoid this difficulty, a braking means is provided and actuated responsive to thrust of the rotor in a direction opposite the flow. In carrying out this feature of the invention, the end of the cowl, facing the hub of the rotor, is provided with a brake shoe ring 40 that is adapted to be engaged by the corresponding end of the hub 30 of the rotor 14. The hub of the rotor has a slight longitudinal movement with respect to the spindle 26 on which it is mounted, so that under steady or increased mass flow the brake shoe ring 40 and contact surface at the end of the hub are spaced apart a nominal amount, however the shape of the blades 36 is designed so that the thrust on the rotor responsive to deceleration of the fluid stream will act to reverse the rotor and bring the end surface thereof into contact with the brake shoe ring 40, thereby slowing down the rotor in accordance with the reduced velocity of the flow. The rotor 14 has good response if the inertia is relatively small and if the bearing friction is kept to a minimum. It is thus obvious that the rotor is operated at speeds in close conformance with velocities of the flow.

The radial lift element 16 comprises a cylindrical hub 41 of slightly less diameter than the larger end of the support 15 to permit expansion of the fluid on discharge from the restricted end of the passageway 18. This very small expansion is designed to carry small solid particles away and prevent their falling into the space between the support and the hub. A plurality of vanes 42 project from the hub 41, the vanes 42 having end portions 43 substantially parallel with the axis of the bore 4 and opposite ends curving across the path of the fluid, as indicated at 44 (Fig. 6). The outer edges of the vanes 42 are connected by a circular band 45 contained in a recessed portion 46 of the bore 3. One end of the hub is closed by a wall 47 and the opposite end is closed by a fairing 48 that is fixed by a screw 49 extending through the end wall of the fairing to an inwardly extending boss 50 on the wall 46, as shown in Fig. 2.

The radial lift element thus described is fixed on the end of a shaft 51 that is journaled in antifriction bearings 52 and 53 carried respectively within a head 54 that covers the end of the recess 23 at the larger end of the body portion 17. The shaft 51 has a projecting threaded end 55 for mounting the radial lift element 16 thereon. The body portion 17 of the supporting device 14 contains a spring 56. The spring 56 is preferably in the form of a spiral and has an inner terminal 57 fixed to the shaft 51. The outer end of the spring 56 terminates in an ear 58 which is fixed to the body portion 17 by a fastening device 59. The spring 56 resists deflection of the radial lift element 16, however under impact of the fluid medium against the curved ends 44 of the vanes 42, the radial lift element 16 is deflected in opposition to action of the spring in a clockwise direction (Fig. 1).

The radial lift element 16 is deflected circumferentially proportional to the product of density of flow times the square of the flow velocity, however with speed of the rotor 14 made known, the mass flow can be obtained through arithmetic division. The invention further contemplates automatic computation of the result by means of an electrically operated computer, as now to be described.

While several electrical means may be provided for picking up the rotational speed of the rotor 14 and movement of the radial lift element 16, the rotor 14 illustrated carries a magnet 60 that is mounted within the hub 30 intermediate the antifriction bearings 28 and 29 for establishing a rotating magnetic field about the zone of the rotor. Therefore, the rate in change of the magnetic field is in direct ratio with the speed of the rotor and this change in magnetic field is utilized for generating an alternating current in a pickup coil 61. The pickup coil may be contained within a plug 62 positioned in the rotating field of the magnet. In the illustrated instance, the plug 62 is threaded within an opening 63 in the casing 2. The terminals of the coil 61 are connected with conductors 64 and 65 by which the current is passed to a frequency converter 66, whereby alternating current generated in the coil 61 is changed to a direct current for supply to an electrical analog computer 67 by way of a conductor 68. A power supply, indicated at 69, is used for supplying an input current to the frequency converter and the computer 67.

Mounted in the interior of the body portion 17 is a pickup for deflection of the radial lift element. This may comprise a linear differential transformer including a coil 71 having a movable core 72 therein for controlling voltage of the current in a current supply to the coil 71 through conductors 73 and 74 that may be extended from the coil through a hollow portion of one of the flow straightening blades 19 to connect with a plug 75 that is clamped within a fitting 76, as shown in Fig. 2. The conductor 73 is connected with the power supply and the conductor 74 is connected with a rectifier 77, with the circuit being completed through a conductor 78 that connects with the other terminal of the power supply. The core 72 is actuated in the coil in conformity with deflection of the radial lift element. This is effected by providing the shaft 51 with a cam 79 which makes contact with a cam follower 80. The cam follower 80 is carried on an arm 81 which is supported on a bracket 82 formed of spring material. The bracket 82 has legs 83 and 84 fixed to a lug 85 within the body portion 17. The core 72 is carried from the bracket 82 by a depending arm 86 so that when the cam 79 shifts the arm 80 in one direction against spring action in the legs 83 and 84 of the bracket 82, the core 72 is shifted coaxially of the coil 71. It is, therefore, obvious that deflection of the radial lift element effects a corresponding change in the voltage of the current supplied to the coil 71 and which voltage is rectified by means of the rectifier 77 to supply the other input current to the computer 67 by means of a conductor 87.

The computer 67 is of standard design and functions to supply an output current that is a function of the arithmetic division of the two input currents in real time. Therefore, the current output of the computer is a function of the mass flow rate of the fluid stream passing through the conduit 4. The output of the current of the computer 67 may be supplied through conductors 88 and 89 to a direct reading indicator 90 on which the mass flow rate then existing in the conduit 4 is instantly registered. If it is desired to record mass flow, the output of the computer may be connected through the conductor 89 to a direct reading mass flow integrator 91.

If it is desired to actuate some equipment responsive to mass flow rate of the fluid, the output of the computer may be provided with a third lead 92 for supplying the activating current, as will be understood.

The form of the invention shown in Fig. 5 is similar to the form of the invention just described, with the exception of the mounting for the sensing elements. In this form of the invention, the casing 93 of the sensing unit 1 has a through bore 94 adapted to register with corresponding sections of conduit through which a fluid is conveyed under pressure. The ends of the casing 93 have counterbores 95 and 96 forming annular stop shoulders 97 and 98. The flow straightening device 99 of this form of the invention includes a sleeve 100 having inwardly extending vanes or blades 101 for supporting a hub 102 having a rounding cowl 103 on the upstream end for diverting flow between the blades or fins 101. Adjustably mounted within the hub 102 is a stem 104 carrying a point bearing 105 on the downstream end thereof. The sleeve 100 is retained in abutment with the shoulder 97 by a snap ring 106 that is engaged in an annular groove 107 in the casing 93. Similarly located in the opposite counterbore 96 are tandemly arranged sleeves 108 and 109. The sleeve 108 has radial blades or arms 110 extending longitudinally of the axis of the bore 94 for straightening and reducing turbulence of the fluid stream after it has passed through the rotor 111, as later described. The blades carry an inner coaxial housing 112 having a cowl shaped end 113 for facilitating directional flow of the fluid between the arms 110. The opposite end of the housing is belled outwardly as at 114 to cooperate with an inwardly belled end 115 of the sleeve 108 to form an annular venturi shaped passageway 116 for increasing the velocity flow when passing through the radial lift element 117. The sleeve 109 carries the radial lift element 117, which consists of a hub 118 having radially extending blades 119 that are curved substantially in the same manner as the corresponding blades of the form of invention illustrated in Figs. 1 to 4, inclusive. The hub 118 has an axial boss 120 for fixing one end 121 of the shaft 122. The opposite end of the shaft 122 has a point bearing 123 engaging in an antifriction element such as a jewel 124. The downstream end of the hub 118 carries a similar jewel 125 that cooperates with a point bearing 126 on an adjusting screw 127, somewhat similar to the steam 104 previously described. The adjusting screw 127 is carried in a hub 128 that is centered within the sleeve 109 by radially extending screws 129. The hub 128 forms a fairing for facilitating discharge of the fluid from the radial lift element. The portion 130 of the sleeve 109 immediately surrounding the fairing tapers outwardly to cooperate therewith in forming a gradually expanding annular passageway 131 for the flow of pressure fluid. The sleeve 108 and 109 are retained in position within the counterbore 96 by a snap ring 132, similar to the snap ring 106. Positioned in the housing 112 is a spiral spring 133 having one end fixed to the shaft 122 and its other end fixed to the interior of the housing 112, similar to the corresponding spring of the previously described form of the invention, so as to restrain yieldingly deflection of the radial lift element.

The rotor 111 for determining the velocity of the flow is positioned in the bore 94 between the counterbores 95 and 96 and includes a hollow hub 134 having closed ends 135 and 136 which are shaped to facilitate flow of fluid therearound, whereby the entire flow is passed between the blades 134' of the rotor to effect rotation thereof in accordance with the velocity of the flow. The ends 135 and 136 carry jewels 137 and 138 adapted to be respectively engaged with the point bearing 105 and a corresponding point bearing 139 that is carried by the cowling 113. Mounted within the hollow hub portion 134 and retained by a screw 140 is a magnet 141 for establishing a rotating magnetic field, in the same manner as the rotor previously described. In this form of the invention, the pickup coil 142 in the field of the magnet is mounted in the same manner as the pickup coil of the first described form of the invention, however the radial lift 117 carries a potentiometer 143 that is housed within the housing 112 and which includes suitable electric connections with conductors 144, 145 and 146, the conductor 146 being connected with the power supply 148 and the conductors 144 and 145 with a rectifier 149 corresponding with the rectifier previously described. In other respects the electric circuit and instruments related therewith correspond with those previously described, and corresponding numbers are applied thereto.

Assuming that the sensing unit in the first described form of the invention is constructed and assembled as described and installed in a fluid flow conduit as shown in Fig. 2, the operation is as follows:

The fluid flow on entering the sensing unit is diverted by the cowl 38 for passage between the blades 36 of the rotor 14, the flow being confined between the circumference of the hub 31 of the rotor and the inner peripheral face of the casing 2, so that all of the flow is effective on the blades to effect turning of the rotor in correspondence with the velocity of the flow. Since the magnet 60 is bodily carried by the rotor, the magnetic field thereof rotates to establish an alternating current in the pickup coil 61, which alternating current is converted to a direct current for input into the computer 67. After passing the rotor, the flow continues between the blades 20 of the straightening device 15. The rotor may tend to cause the fluid stream to swirl about the body portion 17 of the straightening device, however as the flow enters between the blades 20 the flow is straightened and discharged at increased velocity incidental to the tapering of the passageway surrounding the body portion 17. The velocity is, therefore, such as to prevent settling out of any particles that may be carried therewith and which might tend to cause jamming of the working parts of the apparatus. The flow is thus divided into straightaway streams to enter the spaces between the radial lift element 16, however as the streams make contact with the curved ends 44 a thrust will be imparted to the blades to cause deflection of the radial lift element against action of the spring 56. Here again the entire stream passes through the radial lift element so that all particles contribute to the movement resulting from contact with the curved surfaces of the vanes 43, after which the streams pass over the fairing 48 to continue passage through the conduit. Deflection of the radial lift element causes the cam 79 to shift the arm 80 in a longitudinal direction and effect movement of the core 72 into the coil 71 to effect control of the voltage of the current passed through the coil in accordance with the amount of deflection of the radial lift element. The current from the coil is passed through the rectifier and supplied to the computer 67 by which the two currents are arithmetically computed to give an output current which corresponds with the mass flow rate of the fluid and which output current effects operation of the instruments 90 and 91 to indicate the mass flow rate and to record the mass flow, respectively. If the sensing unit is to be used for controlling equipment associated with the flow of the fluid, the conductor 92 may be connected with the equipment to be actuated in accordance with change in mass flow rate of the fluid.

In operation of the form of invention shown in Fig. 5, the flow passes between the vanes or blades 101 of the flow straightening device 99 and then in contact with the rotor 111 to effect turning thereof at a speed corresponding with the velocity of the flow. Turning of the rotor 111 produces a rotating magnetic field in the field of the pickup coil 142, whereby an alternating current is generated to be converted and compared with a current having a variable voltage corresponding with the extent of deflection of the radial lift element 117. After passing the rotor 111, the flow is directed between the blades 110 and venturi shaped passageway 116 for discharge between the vanes 119 of the radial lift element 117. After passing between the vanes 119, the flow continues through the venturi shaped passageway 131 and on through the conduit. The electrical operation of this form of the invention is generally the same as that of the first described electrical system.

The jewel bearings are preferably desirable in reducing resistance for the rotor to turn. The parts may also be of less weight to reduce inertia and render the rotor more sensitive to fluctuations in the flow.

What we claim and desire to secure by Letters Patent is:

1. In combination with a conduit for confining a fluid under flow, an apparatus for indicating mass-flow-rate including a unit adapted to be connected coaxially into the conduit, a rotor having circumferentially spaced radial blades, antifriction means mounting the rotor coaxially in said unit, means responsive to rotation of the rotor for establishing an electrical output in a first electrical circuit, means for straightening and increasing velocity of the flow of the fluid after passing through the rotor, a radial lift element having longitudinally curved radial blades, means supporting the radial lift element in the unit in coaxial relation with the axis of the rotor and in position to be directly contacted by the straightened flow, means responsive to movement of the radial lift element for changing electrical output in a second electrical circuit, an electrical division computer, means supplying the electrical output of said circuits to the electrical computer for obtaining an electrical output corresponding to division of the electrical output from the second circuit by the electrical output from the first electrical circuit, and means for recording the electrical output from the electrical computer in terms of mass-flow-rate.

2. In combination with a conduit for confining a fluid under flow, an apparatus for indicating mass-flow-rate of the fluid including a cylindrical casing adapted to be connected coaxially into the conduit, a rotor having circumferentially spaced radial blades, means mounting the rotor coaxially in said cylindrical casing, a magnet carried by and rotatable with the rotor for establishing a variable magnetic field in accordance with variable speed of the rotor to sense the velocity of the flow, an electrical circuit having a coil in said variable magnetic field to provide an electrical output, means for straightening the flow of fluid and directing the fluid through said cylindrical casing, a radial lift deflector having longitudinally curved radial blades, means supporting the radial lift element coaxially within the cylindrical casing with the curved blades in position to be impacted by the flow and in coaxial alignment with the rotor, an electrical current supply including a circuit for a second electrical output, voltage control means in said last named circuit, an operating connection between the voltage control means and the radial lift element for controlling the second electrical output responsive to the flow of said fluid, an electrical division computer, means supplying said electrical outputs of said circuits to the electrical computer for obtaining an electrical output corresponding to mass-flow-rate of the fluid, and means for recording the last named electrical output in terms of mass-flow-rate.

3. A mass-flow-rate measuring apparatus including a fluid tight cylindrical casing in coaxial connection with a flow duct, rotatable means in said casing having angular blades spaced circumferentially thereon and fitting closely within the casing for forming flow passageways at substantially the same radial distances from the axis of said casing, means for distributing the entire flow from the duct through all of said passageways to act uniformly on said blades in turning of the rotor, brake means controlling the rotor responsive to velocity of the fluid, a radial lift element coaxially mounted in the casing in spaced relation with the rotor and having circumferentially spaced curved blades extending radially therefrom and fitting closely within the casing, means in the casing between the rotor and the radial lift element forming passageways for conveying the fluid from the passageways of the rotor to the passageways of the radial lift element, the passageways of said means decreasing in capacity toward said radial lift element for increasing the velocity of the fluid, a spring for resisting torque of the radial lift element and yieldable under contact of the fluid with said blades to permit movement of the radial lift element responsive to product of flow density of the fluid and the square of the velocity of the fluid, separate means actuated by the rotation of the rotor and deflection of the radial lift element for creating electrical outputs having values corresponding with the speed of the rotor and movement of the radial life element respectively, and means for electrically dividing said electrical outputs which corresponds to deflection of the radial lift element by the electrical output corresponding to rotation of the rotor for producing electrical output conforming to the mass-flow-rate of the fluid.

4. A mass-flow-rate measuring apparatus including a fluid tight cylindrical casing in coaxial connection with a flow duct, rotatable means in said casing having angular blades spaced circumferentially thereon and fitting closely within the casing for forming flow passageways at substantially the same radial distances from the axis of said casing, means for distributing the entire flow from the duct through all of said passageways to act uniformly on said blades in turning of the rotor, brake means controlling the rotor responsive to velocity of the fluid, a radial lift element coaxially mounted in the casing in spaced coaxial relation with the rotor and having circumferentially spaced curved blades extending radially therefrom and fitting closely within the casing, means in the casing between the rotor and the radial lift element forming passageways for conveying the fluid from the passageways of the rotor to the passageways of the radial lift element, the passageways of said means decreasing in capacity toward said radial lift element for increasing the velocity of the fluid, a spring for resisting torque of the radial lift element and yieldable under contact of the fluid with said blades to permit movement of the radial lift element responsive to product of flow density of the fluid and the square of velocity of the fluid, separate means actuated by the rotation of the rotor and deflection of the radial lift element for creating electrical outputs having values corresponding with the speed of the rotor and movement of the radial lift element respectively, means for electrically dividing the electrical output which corresponds to deflection of the radial lift element by the electrical output corresponding to rotation of the rotor for producing an electrical output conforming to the mass-flow-rate of the fluid, and indicating means activated by the last named electrical output for visibly indicating the mass-flow-rate of the fluid in said duct.

References Cited in the file of this patent
UNITED STATES PATENTS

| | | |
|---|---|---|
| 720,188 | Seidener | Feb. 10, 1903 |
| 1,467,565 | Blair | Sept. 11, 1923 |
| 2,472,609 | Moore | June 7, 1949 |
| 2,697,942 | Engelden | Dec. 28, 1954 |
| 2,709,366 | Potter | May 31, 1955 |
| 2,735,299 | Blackburn et al. | Feb. 21, 1956 |
| 2,772,567 | Boden et al. | Dec. 4, 1956 |